United States Patent
Mitra et al.

(10) Patent No.: US 11,414,522 B2
(45) Date of Patent: Aug. 16, 2022

(54) SILICONE ELASTOMER GELS INCORPORATING NATURAL OILS

(71) Applicant: Wacker Chemie AG, Munich (DE)

(72) Inventors: Amitabha Mitra, Saline, MI (US); Chelsea Grimm, Perrysburg, OH (US); Margaret Whitton, Jackson, MI (US)

(73) Assignee: Wacker Chemie AG, Munich (DE)

( * ) Notice: Subject to any disclaimer, the term of this patent is extended or adjusted under 35 U.S.C. 154(b) by 141 days.

(21) Appl. No.: 15/733,112

(22) PCT Filed: Nov. 20, 2017

(86) PCT No.: PCT/US2017/062547
§ 371 (c)(1),
(2) Date: May 19, 2020

(87) PCT Pub. No.: WO2019/099047
PCT Pub. Date: May 23, 2019

(65) Prior Publication Data
US 2020/0377664 A1   Dec. 3, 2020

(51) Int. Cl.
*C08G 77/20* (2006.01)
*C08K 5/01* (2006.01)

(52) U.S. Cl.
CPC ............ *C08G 77/20* (2013.01); *C08K 5/01* (2013.01)

(58) Field of Classification Search
CPC ......... C08G 77/12; C08G 77/20; C08L 83/01; C08K 5/01; C08K 5/103
See application file for complete search history.

(56) References Cited

U.S. PATENT DOCUMENTS

| | | |
|---|---|---|
| 5,436,308 A | 7/1995 | Durfee et al. |
| 6,262,170 B1 | 7/2001 | Kilgour et al. |
| 6,423,322 B1 | 7/2002 | Fry |
| 6,936,686 B2 | 8/2005 | Awad |
| 2010/0172856 A1 | 7/2010 | Dias et al. |
| 2015/0073059 A1* | 3/2015 | Knoer .................. A61K 8/89 514/772.1 |

FOREIGN PATENT DOCUMENTS

| | | |
|---|---|---|
| JP | 2005154677 A | 6/2005 |
| JP | 2009062493 A | 3/2009 |
| JP | 2015519426 A | 7/2015 |

OTHER PUBLICATIONS

European Patent Office, The International Search Report and Written Opinion, issued in PCT/2017/062547, dated Jul. 13, 2018, 9 pages, European Patent Office, Rijswijk, Netherlands.
European Patent Office, The International Preliminary Report on Patentability, issued in PCT/2017/062547, dated Oct. 10, 2019, 6 pages, European Patent Office, Rijswijk, Netherlands.

* cited by examiner

*Primary Examiner* — Kuo Liang Peng

(57) ABSTRACT

Organopolysiloxane gels containing a hydrocarbon diluent and non-chemically bonded natural oils are prepared by the hydrosilylative gelling of a mixture of an aliphatically unsaturated organopolysiloxane, an Si—H-functional organopolysiloxane, and a long chain α-olefin, in the presence of a hydrocarbon diluent and at least one natural oil. Stable creamy gels are produced by shearing the gel product, and contain only a minor amount of crosslinked organopolysiloxane elastomeric component.

14 Claims, No Drawings

SILICONE ELASTOMER GELS INCORPORATING NATURAL OILS

BACKGROUND OF THE INVENTION

1. Field of the Invention

The present invention is directed to organopolysiloxane gels which cure by hydrosilylation, and which contain free natural oils.

2. Description of the Related Art

Natural oils of both animal and vegetable origin, particularly the latter, were used for thousands of years for cooking. This was particularly true of oils such as olive oil and *sesame* oil. These oils are triglycerides. Triglycerides from the rendering of fat were used, as also was olive oil, to make soap. Some natural oils were suspected of having medicinal properties. More modernly, the so-called omega-3 and omega-6 polyunsaturated triglycerides are widely promoted as dietary supplements.

The industry has made use of the generally good reputation of triglycerides and other natural oils to help promote their products. The use of such natural oils is now ubiquitous, and they may be found in health food formulations, pharmaceuticals, and hair and personal care products, particularly hair care products and cosmetics such as lipsticks, lip balm, skin creams and lotions, etc., in many cases touting the desirable characteristics bestowed by the natural oil.

Silicone oils and gels have numerous uses in these fields as well. These organopolysiloxane products have been used to alter the sensory properties, e.g. the smoothness, touch, etc. of cosmetics and personal care products in general. An advantage of silicones in such products is that they can promote a lasting "silky" feeling (important in hair care products). A further advantage is that the high hydrophobicity of silicones allows them to act as a moisture barrier in personal care products. A disadvantage of silicones includes difficulties in formulating, again due to the highly hydrophobic nature of the silicone. Often, formulations with silicones can exhibit a partial or complete and sometimes irreversible phase out. Much research has been performed over the last two or three decades so as to be able to provide the advantages of silicones, while simultaneously solving the problems associated with silicones.

Silicone gels for use in cosmetics were described by Fry in U.S. Pat. No. 6,423,322 B1. In this process, a silicone gel was prepared by condensing a first silicone bearing ethylenically unsaturated groups and a second silicone bearing Si—H groups. The first silicone also contained silicon bonded polyoxyalkylene groups which served to stabilize the gel against separation. While these gels continue to be used, they present a slightly unpleasant feel in some formulations, which is believed to be due to the surface-active nature of the polyoxyalkylene groups.

It would be beneficial to be able to provide silicone gels which also contain natural oils. The natural oils serve as a renewable resource. However, any combination of silicones and natural oils should retain the natural oils in free form, as otherwise, the health and cosmetic benefits of the oil would be lost. The art has not provided a solution to this problem.

One such solution might have been the incorporation of a natural oil into a preformed silicone gel. This process, however, is very technically demanding, and requires that the gel and the oil be mixed under conditions of very high shear to distribute the oil uniformly in the silicone. This high shear, however, tends to break down the silicone gel structure. In addition to being energy intensive and time consuming, many formulations are prone to separation, either as prepared, or after having been mixed with other personal care product ingredients. This phase separation may be due to the dispersion of the natural oil in the form of very fine droplets, as opposed to incorporation at the molecular level.

In Awad U.S. Pat. No. 6,936,686 B1, are disclosed very specific silicone gels containing oily solvents, but no $SiO_2$ (Q units) or $SiO_{3/2}$ units (T units). The gelation by hydrosilylation is conducted in an oily solvent, which may be a hydrocarbon oil or low viscosity silicone oil. No gels containing natural oils are disclosed.

Dias et al. U.S. published application 2010/0172856 A1 discusses the long standing interest in silicone gels containing natural oils, including triglycerides, and prepares silicone gels by hydrosilylation in a generally two stage process under forcing conditions such that the natural oils, which contain internal ethylenic unsaturation, are first hydrosilylated with a large amount of Si—H-functional silicone and this excess Si—H-containing intermediate product can then be used to hydrosilylate a polysiloxane containing ethylenically unsaturated groups. The reaction is optionally carried out in organic solvent. Dias indicates clearly that the oils are modified with the Si—H polymer to covalently bond the oil into the gel. While this process does use a renewable resource (natural oil) to form part of the gel, the natural oil is no longer in free form, and thus cannot confer the benefits of the free oil. It cannot, for example, migrate through the epidermis in polymer-bound form. Moreover, the amount of the natural oil which can be incorporated into the polymer is limited to low amounts.

It would be desirable to provide silicone gels which exhibit good sensory properties, preferably free of polyoxyalkylene groups, and which can incorporate large amounts of natural oils in free form.

SUMMARY OF THE INVENTION

It has now been surprisingly and unexpectedly discovered that organopolysiloxane gels which contain a large amount of free natural oils can be prepared by reacting an organopolysiloxane containing ethylenic unsaturation, an organopolysiloxane bearing silicon-bonded hydrogen, a long chain 1-alkene, a hydrocarbon solvent, and a natural oil, in the presence of a hydrosilylation catalyst. The natural oil does not substantially react, and is included in the gelled elastomer in free form. The gel may be sheared to produce a creamy gel free from separation.

DETAILED DESCRIPTION OF THE PREFERRED EMBODIMENTS

By the method described herein, a large portion of a silicone gel can be replaced by inexpensive organic solvent, and a further large proportion can be replaced by a natural oil. Gels with a low proportion of silicone may be produced. Unlike gels prepared using low molecular weight cyclics such as decamethylcyclopentasiloxane (D5), the gels employing solvents such as isodecane, and natural oils, are storage stable and do not separate as do gels prepared with D5, or gels prepared by first forming a complete gel, then adding the natural oil, and homogenizing under high shear. In the latter case, as discussed previously, it is believed that the freedom from separation may be caused in part by incorporation of the natural oil at a molecular level, and not in the form of a dispersion of very small (nanosize) droplets.

Five ingredients are absolutely required for the inventive process to produce the inventive gels, although other ingredients can be added as needed. The five essential ingredients are A) an organopolysiloxane bearing minimally two ethylenically unsaturated groups; B) an organopolysiloxane bearing minimally two Si—H groups; C) a long chain 1-alkene, D) a natural oil, and F) a hydrosilylation catalyst. Each of these necessary ingredients will be described hereafter.

The organopolysiloxane A) may be an organopolysiloxane resin bearing ethylenically unsaturated groups, a linear, α-ω-di(ethylenically unsaturated) organopolysiloxane, or a branched organopolysiloxane bearing ethylenically unsaturated groups, or any combination of these. Cyclic organopolysiloxanes are not preferred.

The terms "resin," "silicone resin," and "organopolysiloxane resin" are used in their art-recognized sense, as highly crosslinked, network-like polymers, as described in Noll, CHEMISTRY AND TECHNOLOGY OF SILICONES, Academic Press, N.Y., © 1968. Thus, linear and branched organopolysiloxane are not silicone resins, nor are they described as "resinous" by one skilled in the art, even when of extremely high molecular weight, and solid or semisolid. Most silicone resins are of low to moderate molecular weight, and are generally but not always solids, soluble in organic solvents such as toluene.

Silicone resins are constructed of M, D, T, and Q units. These building blocks, respectively, provide 1, 2, 3, and 4 siloxy linkages. This nomenclature is well known to those skilled in the art. Using "R'" as a general organic group, the formulae of M, D, T, and Q groups are:

(M) $R'_3SiO_{1/2}$, e.g. $(CH_3)_3$—Si—O—,
(D) $R'_2SiO_{2/2}$, e.g. —O—Si(Me$_2$)—O—,
(T) $R_3SiO_{3/2}$, e.g.

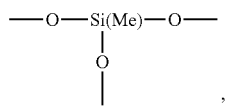

and (Q) $SiO_{4/2}$, i.e. "silicate".

This terminology can be used for all silicone resins. As can be seen, the M groups serve as terminal groups or chain stoppers, the D groups provide a linear section to the molecule, and T and Q units contribute branching sites. A silicone resin must contain at least one T or Q group. Common silicone resins may be described as MQ, MT, MTQ, T, MDT, MDQ, etc. The proportion of D groups is small, generally less than 20 mol percent and usually much less than this, and as a result, the resins are very highly crosslinked in three dimensions. In the silicone resins used as component A), the $R^1$ groups are the R and $R^1$ described below. The silicone resins contain minimally two $R^1$ groups, preferably 5-100, and more preferably 20-80 $R^1$ groups.

The organopolysiloxane A) contain a plurality of terminal aliphatically unsaturated groups, on average at least two of such groups, and preferably correspond to the general formula:

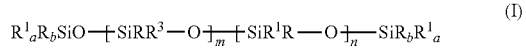
(I)

where a is 1 or 2, b is 1 or 2, and the sum of a+b is 3; m is preferably 10 to 200, more preferably 15 to 75, and yet more preferably 15 to 40; n is 0-10, preferably 0-5, more preferably 0-3, and most preferably 0;

$R^1$ is an aliphatically unsaturated hydrocarbon group;
R is a $C_{1-20}$ hydrocarbon group containing no aliphatic unsaturation;
$R^3$ is R or an organosiloxy or polyorganosiloxy group containing —OSiR$_2$— siloxy groups and terminated by an $R_3SiO$— group or by a $R^1{}_aR_bSiO$— group, where a, b, and the sum a+b have the meanings previously given.

The preferred organopolysiloxane polymers (A) are silicone resins and/or linear or lightly branched silicone polymers having terminal aliphatically unsaturated groups, preferably one such group at each polymer chain terminus. Linear polymers (A) are preferred. For lightly branched polymers A), organosiloxy or polyorganosiloxy groups may be non-functional, or may contain aliphatic unsaturation. Non-functional branches, when present, are preferably terminated by groups such as trimethylsilyl groups. The silicone resins A) preferably contain their aliphatic unsaturation, preferably olefinic unsaturation, in terminal M groups.

Suitable hydrocarbon groups R are optionally substituted $C_{1-20}$ hydrocarbons, including alkyl groups such as methyl, ethyl, n-propyl, and isopropyl, butyl groups such as the n-butyl group, pentyl groups such as the n-pentyl group, hexyl groups such as the n-hexyl group, heptyl groups such as the n-heptyl group, octyl groups such as the n-octyl, isoctyl, and 2-ethylhexyl groups, decyl groups, dodecyl groups, octadecyl groups, and eicosyl groups; cycloalkyl groups such as cyclopentyl methylcyclopentyl, cyclohexyl, and methylcyclohexyl groups; aryl groups such as phenyl, naphthyl, and anthracyl; and aralkyl groups such as the benzyl and α- and β-phenylethyl groups, among many hydrocarbon groups which are suitable. Although not shown in Formula (I), it is also possible to include R groups with more than 20 carbon atoms in addition to $C_{1-20}$ hydrocarbon groups, but this is not preferred.

If the hydrocarbon groups are substituted, preferred substituents are halogens such as bromine, chlorine, and fluorine, cyano groups, acyl groups, epoxy groups, and the like, preferably cyano and chloro groups. Examples of substituted hydrocarbons are the chlorophenyl, trifluoromethyl, hexafluoropropyl, heptafluoropropyl, o, m, and p-chlorotolyl, and the like.

Preferred R groups are the methyl, ethyl, n-propyl, hexafluoropropyl, heptafluoropropyl, ethylphenyl, and phenyl groups. Methyl groups are most preferred.

The aliphatically unsaturated groups $R^1$ include $C_{2-18}$ aliphatically unsaturated hydrocarbons such as vinyl, allyl, 2-propenyl, 3-butenyl, 5-hexenyl, and propargyl groups, and in particular, aliphatic hydrocarbons with terminal ethylenic unsaturation. Preferred aliphatically unsaturated hydrocarbons $R^1$ are the vinyl and allyl groups, most preferably the vinyl group. The ethylenic or ethylenic unsaturation is preferably terminal.

$R^3$ is preferably R, more preferably methyl. $R^3$ may also be an organosiloxy group such as $R_3SiO$— or $R^1R_2SiO$—, or may be an organopolysiloxane group such as one of the general formula:

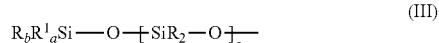
(III)

where o is from 0 to 50, preferably 1 to 30. Most preferably, $R^3$ is R, in other words, the organopolysiloxane A) are linear, unbranched molecules, or essentially unbranched. In this context, "essentially unbranched" means that organosiloxy or organopolysiloxy branches are not purposefully added during synthesis of organopolysiloxanes A). The number of siloxy units containing $R^3$ moieties is, on average, preferably less than 5, more preferably less than 4, yet more preferably less than 3, and still more preferably, 2 or less. Most preferably, the organopolysiloxanes (A) are unbranched, i.e. contain on average no groups $R^3$ which are siloxy or polysiloxy groups. By this latter term is meant that the number of $R^3$ siloxy or polysiloxy groups is essentially zero, only containing branched siloxy groups as an unavoidable artifact of organopolysiloxane synthesis.

Cyclic aliphatically unsaturated organopolysiloxanes A) are of the formula

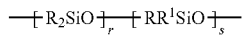

wherein R and $R^1$ have the meanings given above, r is 0-10, s is 2 to 10, and the sum of r+s is 3-10 on average. The use of aliphatically unsaturated cyclic organopolysiloxane is not preferred, and these are preferably absent. It should be noted that such cyclic organopolysiloxane are often present in minor amounts in linear and lightly branched organopolysiloxane due to their mode of preparation. The term "free from aliphatically unsaturated cyclic organopolysiloxane" does not preclude the presence of such organopolysiloxane which are not purposefully added, but may be present in minor amounts, less than 20 wt. %, more preferably less than 10 wt. %, and yet more preferably less than 5 wt. %, due to the method of preparing the linear or lightly branched aliphatically unsaturated organopolysiloxanes, these weight percentages based on the total weight of the cyclic and linear and/or lightly branched organopolysiloxanes.

The organopolysiloxanes A) are available commercially or are preparable by known methods of organosilicon chemistry.

The organopolysiloxane crosslinkers contain a plurality of silicon-bonded hydrogen atoms ("Si—H" groups). These Si—H groups are preferably present along the chain of the preferred linear or lightly branched crosslinker, but may also be present as terminal groups, which, however, is not preferred. Such crosslinkers have essentially the same formulae as do the aliphatically unsaturated organopolysiloxane, where some R groups and/or $R^1$ groups are replaced by H. Most preferably, the Si—H-functional crosslinkers do not contain both aliphatic unsaturation and silicon-bonded hydrogen, although this is possible. When both silicon-bonded hydrogen and aliphatic unsaturation are present, such molecules can serve as all or part of the Si—H-containing crosslinker, and may serve also as all or part of the aliphatically unsaturated organopolysiloxane. It is thus possible for a single organopolysiloxane to act as both the ethylenically unsaturated organopolysiloxane and the Si—H-functional crosslinker, although this is not preferred.

The organopolysiloxane crosslinkers B) preferably are of the general formula

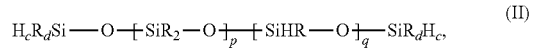
(II)

where R is as defined previously, p is from 0 to 200, preferably from 10 to 150, and more preferably from 40-120, and q is from 0 to 200, preferably 10-150, more preferably 20-100 where the p diorganosiloxy groups, and q hydrogen organosiloxy groups are distributed in any manner, preferably randomly, and preferably not in block form, and the sum of p+q is at least 2. R is preferably methyl, ethyl, or phenyl, more preferably methyl. In the crosslinker (II), c is 0 or 1, preferably 0, d is 2 or 3, preferably 3, and the sum of c+d is 3. Organopolysiloxane/crosslinkers (B) where one or both of the tri(hydrocarbon)-substituted siloxy or silyl groups $R_3SiO$— or $R^3Si$— are present, are preferred. Most preferably, there are no terminal groups containing silicon-bonded hydrogen. The mole percentage of siloxy groups bearing silicon-bonded hydrogen is preferably at least 5 mole percent, more preferably at least 15 mole percent, and most preferably at least 25 mole percent.

The organopolysiloxanes (B) are available commercially or are preparable by known methods of organosilicon chemistry.

The long chain 1-olefin ("α-olefin") C) is a terminally ethylenically unsaturated hydrocarbon with minimally 6 carbon atoms, more preferably 8-20 carbon atoms, and most preferably 10-18 carbon atoms. The long chain α-olefin may also be multiply unsaturated, so long as there is but a single terminal ethylenic unsaturation, as internal olefinic unsaturation is much less reactive. See, e.g. Durfee et al. U.S. Pat. No. 5,436,308 in this respect. Use of long chain α-olefins with multiple ethylenic unsaturation is possible, but not preferred. Linear α-olefins are preferred, although branched α-olefins are also suitable.

Examples of suitable α-olefins C) include 1-hexene, 1,5-hexadiene, 1-octene, 1-undecene, 1-decene, 1-dodecene, 1-tetradecene, 1-hexadecene, 1-octadecene, and 1-eicosene. Such compounds are widely commercially available.

The hydrocarbon solvent D) may be aliphatic, aromatic, arylaliphatic, or alkaryl. Aliphatic linear or branched hydrocarbons and their mixtures are preferred. Most preferred are hydrocarbon solvents which are cosmetically suitable. Examples of suitable hydrocarbon solvents are n-dodecane, i-dodecane, tetradecanes, octadecanes, toluene, xylenes, and the like. Various distillative cuts of hydrocarbon solvents are also acceptable. Preferred are isodocane and various dodecane isomer mixtures, and petroleum fractions containing predominately $C_{8-20}$ aliphatic linear and/or branched hydrocarbons. Such solvents and solvent mixtures are widely available.

The natural oils E) are preferably mono-, di- and triester oils containing, respectfully, one, two, or three hydrocarbon moieties as an esterified group. These natural oils are available from renewable natural sources, both animal and vegetable. The esterified hydrocarbon moiety may be saturated or unsaturated. Most preferably, the natural oils are naturally occurring triglycerides, which may optionally be partially saponified. Further natural oils, unless indicated otherwise, include vitamin oils and their oily, liquid derivatives, such as α-tocopherol, calciferol, and retinol. The natural oils E) may contain free or esterified hydroxyl or carboxylic acid groups.

Together, the hydrocarbon solvent(s) (D) and natural oil(s) (E) may be termed "diluents."

Representative, non-limiting examples of vegetable oils suitable as component B) in the present invention include; coconut oil, *jojoba* oil, soybean oil, safflower oil, linseed oil, corn oil, sunflower oil, canola oil, *sesame* oil, cottonseed oil, *palm* oil, rapeseed oil, tung oil, fish oil, peanut oil, sweet almond oil, beautyleaf oil, *palm* oil, grapeseed oil, *arara* oil, cottonseed oil, apricot oil, *Castor* oil, alfalfa oil, marrow oil, cashew nut oil, oats oil, lupine oil, kenaf oil, *Calendula* oil, *Euphorbia* oil, pumpkin seed oil, coriander oil, mustard seed oil, blackcurrant oil, *Camelina* oil, tung oil tree oil, peanuts oil, *opium* poppy oil, *Castor* beans oil, pecan nuts oil, brazil nuts oil, oils from brazilian trees, wheat germ oil, candlenut oil, marrow oil, *karate* butter oil, barley oil, millet oil, blackcurrant seed oil, shea oil (also known as shea butter), maize oil, evening primrose oil, passionflower oil, passionfruit oil, *quinoa* oil, musk rose oil, *Macadamia* oil, *muscat* rose oil, hazelnut oil, *avocado* oil, olive oil or cereal (corn, wheat, barley or rye) germ oil and combinations thereof.

Hydrosilylation catalysts F) are well-known, and are generally elements of the platinum group of metals, or compounds or complexes thereof. Examples of catalysts F) include metallic and finely divided platinum which can be present on supports such as silicon dioxide, aluminum oxide or activated carbon, compounds or complexes of platinum, for example platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without detectable inorganically bound halogen, bis(gamma-picoline)platinum dichloride, trimethylenedipyridineplatinum dichloride, dicyclopentadieneplatinum dichloride, (dimethyl sulfoxide)ethyleneplatinum(II) dichloride and also reaction products of platinum tetrachloride with olefin(s) and primary amine or secondary amine, or primary and secondary amine, for example the reaction product of platinum tetrachloride dissolved in 1-octene with sec-butylamine, or ammonium-platinum complexes.

A particularly preferred catalyst F) is the so-called Karstedt catalyst, i.e. a Pt(0) complex, in particular the platinum(0)-1,3-divinyl-1,1,3,3-tetramethyldisiloxane complex of the formula $Pt_2[[(CH_2=CH)(CH_3)_2Si]_2O]_3$.

The amount of catalyst must be sufficient for the hydrosilylation of the ethylenically unsaturated organopolysiloxane (A) and the α-olefin by the Si—H-functional crosslinker (B). The catalyst may be added in one or more steps. The total catalyst added may range from 1 ppm to 100 ppm, more preferably 1 ppm to 50 ppm, and most preferably 2 ppm to 20 ppm, all based on elemental platinum, and calculated based on the total weight of ethylenically unsaturated organopolysiloxane, Si—H-functional crosslinker, α-olefin, and diluent(s).

The reaction temperature is preferably from 30° C. to less than 150° C., more preferably 50° C. to 90° C., and most preferably 70° C. to below 90° C. Since the reaction is exothermic, the reaction may initially proceed at a low temperature, the temperature reaching the preferred range some time after the onset of the reaction. Likewise, the exotherm may drive the reaction, at least temporarily, to higher temperatures, but this is not preferred. At the end of the reaction, which may last from several minutes to several hours, e.g. 3-4 hours, preferably 1.5 to 2.5 hours, a catalyst poison or inhibitor may be added to inactivate the hydrosilylation catalyst. Suitable catalyst poisons are known, and include mercaptans and mercapto-functional organopolysiloxane.

The hydrosilylation is conducted under conditions such that substantially little if any natural oil becomes covalently chemically bonded to the gel. Preferably less than 10 mol percent of the natural oil present is chemically bonded, more preferably less than 5 mol percent, yet more preferably less than 3 mol percent, and most preferably less than 2 mol percent and also less than 1 mol percent. Most preferably, none of the natural oil becomes chemical bonded. The amount of oil which remains free can be measured by extracting the resulting gel with an organic solvent in which the oil is soluble and subjecting this extract to analysis by GPC or HPLC.

The amount of silicone gel present in the gelled composition may range from about 5 wt. % to about 50 wt. % based on the total weight of the gel, preferably 10-40 wt. %, and more preferably 15-35 wt. %. Amounts of 20-30 wt. % have been proven to be especially useful. The weight of silicone gel is based on the total weights of ethylenically unsaturated organopolysiloxane and Si—H-functional crosslinker, relative to the total weight of the gel product also containing hydrocarbon diluent and natural oil. The amount of gel present is preferably such that the resulting composition is stable with regard to separation, either as prepared or after shearing to form a creamy gel.

Between the ethylenically unsaturated organopolysiloxane and the Si—H-functional organopolysiloxane, the average functionality must be greater than 2, preferably greater than 2.2, more preferably greater than 2.5, and yet more preferably 3 or more. Use of ethylenically unsaturated linear or lightly branched organopolysiloxanes with at least two terminal ethylenically unsaturated groups, preferably vinyl groups, or the use of organopolysiloxane resins containing $M^{Vi}$ groups are preferred, as are Si—H-functional linear or lightly branched organopolysiloxanes containing a high plurality of Si—H groups, these preferably being positioned along the organopolysiloxane chain rather than terminally. If the average functionality of the gel-forming reactants is too low, essentially linear or extended reaction products, which are generally liquids or thermoplastic gums, rather than crosslinked gels, may be formed. Adjustment of the amounts of organopolysiloxane gel forming ingredients A) and B) in order to produce crosslinked gels is within the knowledge of one skilled in the art.

Either the ethylenically unsaturated groups or the Si—H groups may be present in excess, or these may be present in stoichiometric amounts. It is preferred that the total number of moles of ethylenically unsaturated groups from the α-olefin and the organopolysiloxane combined is at least in stoichiometric amount or in excess relative to the moles of Si—H groups. The ratio of total moles of ethylenically unsaturated groups to Si—H could range from 1:1 to 10:1 or higher.

It is important that the α-olefin is completely or at least partially reacted onto the Si—H-functional organopolysiloxane near the beginning of gel preparation. The long chain α-olefin ensures compatibility of the natural oil with the gel, which is needed to avoid later separation. Since the α-olefin is far more reactive toward hydrosilylation than the internal aliphatic unsaturation of natural oils containing such internal unsaturation, several methods of preparation are suitable. In one such method, the Si—H-functional crosslinker, α-olefin, hydrocarbon diluent, and natural oil are initially charged to a suitable reactor, and then the aliphatically unsaturated organopolysiloxane is added. Little or no reaction of the natural oil, which may also be regarded as a diluent, occurs, because of the presence of the much more reactive α-olefin and ethylenically unsaturated organopolysiloxane. In one variant of the invention, the Si—H functional organopolysiloxanes B) is reacted with the α-olefin in a separate step, or is contained in the organpolysiloxane A) during its synthesis.

In a further, preferred, embodiment, in a first step, the α-olefin, Si—H-functional crosslinker, diluent, and hydrosilylation catalyst are mixed, reaction is allowed to take place in the presence of the natural oil, and then the aliphatically unsaturated organopolysiloxane is added, preferably with additional catalyst, and further reaction is allowed to proceed until gelation occurs. The addition of all or part of the hydrocarbon diluent may be delayed, in either case, but is added prior to gelation. In both reactions, the final gel product may be sheared, for example with a rotor/stator mixer, to provide a uniform, creamy gel. Other reaction sequences are also possible, although the natural oil and Si—H-functional organopolysiloxane should not remain together in the presence of the hydrosilylation catalyst for an extended period of time at elevated temperature without also the presence of either or both of the long chain α-olefin and aliphatically unsaturated organopolysiloxane, to avoid any substantial covalent incorporation of the natural oil, which would then prevent the natural oil from being freely available in the gel.

Other components may be added, preferably prior to gelation, but may be added afterwards as well, in particular to the creamy gel. Multiply unsaturated α-olefins, i.e. α, ω-divinyl or diallyl hydrocarbons such as various octadiene isomers, 1,5-hexadiene or butadiene may be added to serve as further crosslinkers during the reaction. These must be added while hydrosilylation is still occurring. Fragrances, pigments, fillers, plasticizers (both reactive and non-reactive), low molecular weight volatile siloxanes (linear or cyclic), preservatives (e.g. biocides), dyes, vitamins, plant extracts, epidermal transport facilitators (such as dimethylsulfoxide and dimethylsulfone), non-reactive organopolysiloxane and silicone resins, humectants (such as propylene glycol, glycerine, dipropylene glycol), medicaments, etc. may be added. All these are preferably added prior to full gelation. It is preferable that the amount of volatile silicones, e.g. low molecular weight linear and cyclic silicones (such as D4 and D5) be kept to a minimum, or be absent. It is also preferable that the amounts of polyoxyalkylene groups, e.g. polyoxypropylene groups, polyoxytheylene groups, and poly(oxyethylene/oxypropylene) groups which may be incorporated into the Si—H-functional crosslinker and/or aliphatically unsaturated organopolysiloxane be kept to a minimum. Such groups are preferably absent altogether, as they may interfere with the sensory feel of the gel in cosmetic and personal care applications.

The invention will now be further described by examples of gel preparation, and by examples directed to some uses of the inventive gels. These examples are illustrative, and should not be viewed as limiting the scope of the invention.

EXAMPLES

Method A: 1 Stage Reaction

A 2000-ml glass reactor is equipped with a condenser, nitrogen inlet, temperature probe, anchor stirrer with wiper attachments, and temperature control system. The reactor is purged with nitrogen, and the reaction is done under continuous nitrogen flow. The diluent (s), the hydrosilylation catalyst and the SiH-functional crosslinking agent are added while stirring at 75 rpm. At this point, the unsaturated organopolysiloxane resin or the vinyl terminated siloxane is added, and the mixture is stirred for approximately 1 minute. The reaction mixture is heated in a temperature controlled oil bath at 80° C. with a stirring speed of about 50 rpm for 2 hours. Then the catalyst inhibitor is added and the mixture is mixed at 50 rpm for 15 minutes. The heating is removed and the mixture is cooled to room temperature with stirring at 50 rpm. The mixture is homogenized for 5 minutes at 800 rpm with an ULTRA-TURRAX® T 25 homogenizer.

Method B: 2 Stage Reaction

A 2000-ml glass reactor is equipped with a condenser, nitrogen inlet, temperature probe, anchor stirrer with wiper attachments, and temperature control system. The reactor is purged with nitrogen, and the reaction is done under continuous nitrogen flow. In the first step, the diluent(s), 1-octadecene, the hydrosilylation catalyst and the SiH-functional crosslinking agent are added while stirring at 75 rpm. The mixture is heated in a temperature controlled oil bath to 80 C and mixed at this temperature for 30 minutes. At this point, the unsaturated organopolysiloxane resin or the vinyl siloxane is added, and the mixture is stirred for approximately 1 minute. A second dose of the hydrosilylation catalyst is added, and the reaction mixture is heated at 80° C. with a stirring speed of about 50 rpm. It is stirred at this temperature for 2 hours. Then the catalyst inhibitor is added and the mixture is mixed at 50 rpm for 15 minutes. The heating is removed and the mixture is cooled to room temperature with stirring at 50 rpm. The mixture is homogenized for 5 minutes at 800 rpm with an ULTRA-TURRAX® T 25 homogenizer.

TABLE 1

|  | Example | | | |
| --- | --- | --- | --- | --- |
|  | Ex. 1 | Ex. 2 | Comp. Ex. C1 | Comp. Ex. C2 |
| Method | B | B | A | B |
| Diluent (Isododecane) (g) | 231.0 | 231.0 | 238.8 | — |
| Diluent (Cyclopentasiloxane) (g) | — | — | — | 231.0 |
| Diluent (Coconut Oil) (g) | 231.0 | 231.0 | 238.8 | 231.0 |
| Unsaturated silicone resin [1] (g) | 110.33 | — | 107.5 | — |
| Bis-vinyl terminated linear polydimethyl siloxane [2] (g) | — | 88.55 | — | 88.55 |
| Si—H containing silicone crosslinking agent[3] (g) | 17.30 | 26.99 | 11.9 | 26.99 |
| 1-octadecene (g) | 6.04 | 15.72 | — | 15.72 |
| Catalyst [4] (g) (dose 1 + dose 2) | 0.238 + 0.194 | 0.371 + 0.304 | 0.3 | 0.371 + 0.304 |
| Platinum poison [5] (g) | 3.90 | 6.07 | 2.7 | 6.073 |
| Batch size (g) | 600 | 600 | 600 | 600 |

TABLE 1-continued

| | Example | | | |
|---|---|---|---|---|
| | Ex. 1 | Ex. 2 | Comp. Ex. C1 | Comp. Ex. C2 |
| Mol α-olefin/mol Si—H | 0.30 | 0.5 | — | 0.5 |
| Mol Si-vinyl/mol Si—H | 0.97 | 0.69 | | 0.696 |
| Viscosity (mPa · s) | 42,160 | 112,640 | Not determined | Not determined |
| Storage modulus G' (Pa) | 223 | 697 | Not determined | Not determined |
| Properties | Creamy, stable | Creamy, stable | Two phase | Two-phase |
| Appearance | Translucent | Translucent | Two-phase | Two-phase, no gel |
| Stable in storage | Yes | Yes | No | No |
| Elastomer (% by weight) in the finished gel | 23.0 | 23.0 | 20.0 | 23.0 |

[1] Ratio M/MVi/Q = 7.6/1/11.4, Mn = 2570, MW = 5440, iodine number = 18;
[2] Viscosity = 20 mm$^2$/s, iodine number = 25
[3] Poly(methylsiloxane-co-dimethylsiloxane) of approximate formula M(D)$_x$(D$^H$)$_y$M[0.46% w/w H content, x + y = 140];
[4] WACKER ® CATALYST OL available from Wacker Chemie AG (1% w/w Pt content)
[5] Polysiloxane having 3-mercaptopropyl groups; viscosity 190 mm$^2$/s at 25° C., mercaptan content 0.29% by weight;

Thus stable gels were obtained only with alkyl substitution and a mixture of coconut oil and isododecane as the diluent. Comparative examples, one with no alkyl substitution by the α-olefine, and the other with octadecyl substitution but with a mixture of coconut oil and cyclopentasiloxane as the diluent but no hydrocarbon diluent, were not stable.

Evaluation of Skin Feel of Raw Elastomer Gels Samples

The sensory properties of the stable elastomer gels from Ex. 1 and Ex. 2 were compared against a commercial elastomer gel BELSIL® RG 90 (INCI: Isododecane (and) vinyldimethyl/trimethylsiloxysilicate stearyl dimethicone crosspolymer) by 6 panelists. For this, the 0.025 g samples were applied on the forearm of each panelist while the panelist used one finger to rub the formulation on the forearm over an area of 4 cm$^2$. After application on the skin, the sensory properties of the residues were assessed relative to one another. Each panelist was asked to assign a relative score between 1 (poor) to 3 (good) to each sample (exception for 'oily' and 'sticky' for which lower numbers mean good and higher numbers mean poor). The following table shows the cumulative score given by the six panelists for each sample.

TABLE 2

| Characteristic | Sample A: BELSIL® RG 90 | Sample B: Ex. 1 | Sample C: Ex. 2 |
|---|---|---|---|
| Spreadability | 8 | 13 | 15 |
| Velvety feel | 7 | 13 | 16 |
| Smoothness | 8 | 10 | 18 |
| Moisturizing feel | 9 | 10 | 17 |
| Oily | 6 | 13 | 17 |
| Sticky | 11 | 16 | 9 |
| Powdery | 16 | 14 | 6 |
| overall feel | 9 | 10 | 17 |

Thus, inventive Example 1 and Example 2 were judged by the panelists to provide better spreadability and more velvety, smooth, moisturized and less sticky feel over the comparative example. Besides, the panelists judged the gel of Example 2 to provide the best overall feel.

Formulation Examples

Body butter formulations were made with comparative elastomer gel BELSIL® RG 90 (INCI: isododecane and vinyldimethyl/trimethylsiloxysilicate stearyl dimethicone crosspolymer, Formulation 1) and two inventive examples: Example 1 (Formulation 2) and Example 2 (Formulation 3) as below:

| Phase | INCI Name | Material | Form. 1 | Form. 2 | Form. 3 |
|---|---|---|---|---|---|
| A | Propylene Glycol | Propylene Glycol USP (Rita Corp.) | 3.00 | 3.00 | 3.00 |
| | Aqua (DI water) | DI Water | 51.60 | 51.60 | 51.60 |
| | Xantham Gum | Keltrol® CG-SFT (Rita Corp.) | 0.20 | 0.20 | 0.20 |
| B | Cetyl alcohol | Lanette 16® (Cognis Corporation) | 3.50 | 3.50 | 3.50 |
| | Ozokerit | Ozokerit 164/170 (Koster Keunen) | 1.00 | 1.00 | 1.00 |
| | Steareth-2 | Lipocol S-2 (Lipo Chemicals) | 3.00 | 3.00 | 3.00 |
| | Ceteareth-20 | Emulgin® B2 (BASF) | 2.10 | 2.10 | 2.10 |
| | Cetearyl Olivate, Sorbitan Olivate | Olivem® 1000 (Hallstar) | 3.00 | 3.00 | 3.00 |
| | BHT | Tenox BHT (Eastman) | 0.05 | 0.05 | 0.05 |
| | Butyrospermum Parkii (Shea Butter) | Cetiol SB-45® (Cognis Corporation) | 3.50 | 3.50 | 3.50 |
| | C26-28 Alkyl Methicone | BELSIL® CM 7026 VP (Wacker Chemie AG) | 2.00 | 2.00 | 2.00 |
| | PPG-15 Stearyl Ether | Cetiol® E (BASF) | 2.50 | 2.50 | 2.50 |
| | Vitis Vinifera (Grape) Seed Oil | Grape Seed Oil (Jeen International) | 4.00 | 4.00 | 4.00 |

-continued

| Phase | INCI Name | Material | Form. 1 | Form. 2 | Form. 3 |
|---|---|---|---|---|---|
| | *Olea Europaea* (Olive) Fruit Oil | Lipocol O (Lipo Chemicals) | 5.00 | 5.00 | 5.00 |
| C | Isopropyl myristate | Isopropyl myristate | 2.00 | 2.00 | 2.00 |
| | Isododecane and Vinyldimethyl/ Trimethyl- siloxysilicate Stearyl Dimethicone Crosspolymer | BELSIL ® RG 90 (Wacker Chemie AG) | 4.00 | — | — |
| | Gel of Example 1 | | — | 4.00 | — |
| | Gel of Example 2 | | — | — | 4.00 |
| D | Dimethicone | BELSIL ® DM 10 (Wacker Chemie AG) | 4.00 | 4.00 | 4.00 |
| | Dicaprylyl Ether | Cetiol ® OE (BASF) | 3.00 | 3.00 | 3.00 |
| E | Dimethicone | BELSIL ® DM 0.65 (Wacker Chemie AG) | 2.00 | 2.00 | 2.00 |
| F | Phenoxyethanol (and) Ethylhexyl- glycerine | euxyl ® PE 9010 (Schülke & Mayr GmbH) | 0.30 | 0.30 | 0.30 |
| | Perfume | Pink Grapefruit (Fragrance Resources) | 0.25 | 0.25 | 0.25 |
| | Total: | | 100.00 | 100.00 | 100.00 |

Preparation is as follows: mix phase A and start heating to 80 C. Prepare phase B and heat to 80-85 C. Add phase B to phase A while mixing with an Ultra-Turrax® mixer. Start cooling under slow stirring.

Prepare Phase C, stir at least 10 min and add to phase AB at 60 C. Add phase D one by one. Homogenize again with Ultra-Turrax. Add other phases one by one below 40 C under slow stirring.

Evaluation of Formulations

The sensory properties of the body butter formulations 1, 2, and 3 were assessed by 7 panelists. For this, the 0.025 g samples were applied on the forearm of each panelist while the panelist used one finger to rub the formulation on the forearm over an area of 4 cm². After application on the skin, the sensory properties of the residues were assessed relative to one another. Each panelist was asked to assign a score between 1 to 3 to each sample.

The following table shows the cumulative score given by the seven panelists for each sample.

Panel Test Results for Body Butter Samples

| Characteristic | Formulation 1 | Formulation 2 | Formulation 3 |
|---|---|---|---|
| Absorption | 15 | 15 | 13 |
| Spreadability | 13 | 13 | 18 |
| Slipperiness | 9 | 14 | 19 |
| Moisturizing | 11 | 15 | 16 |
| Silkiness | 14 | 14 | 15 |
| Stickiness | 12 | 13 | 9 |
| Oily | 10 | 16 | 12 |
| Overall feel | 12 | 14 | 16 |

Thus, Formulations 2 (based on inventive Example 1) and 3 (based on inventive Example 2) were judged by the panelists to provide more slippery and more moisturizing feel. Formulation 3 was judged to have the most spreadability and least stickiness out of the three samples. Both formulations 2 and 3 based on the inventive examples were judged by the panelists to have better overall feel vs. formulation 1, which is a comparative example.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An organopolysiloxane gel containing at least one natural oil free in the gel, comprising:
   a) a crosslinked organopolysiloxane gel which is the reaction product of A) an aliphatically unsaturated organopolysiloxane B), an Si—H-functional organopolysiloxane, and C) an α-olefin containing 6 or more carbon atoms;
   b) at least one hydrocarbon diluent D); and
   c) at least one natural oil E), wherein both the hydrocarbon diluent(s) D) and natural oil(s) E) are present in the composition prior to complete gelation of a reaction mixture comprising the aliphatically unsaturated organopolysiloxane, Si—H-functional organopolysiloxane, and α-olefin reactants of (a), the gelation taking place in the presence of a hydrosilylation catalyst F).

2. The gel of claim 1, wherein the aliphatically unsaturated organopolysiloxane comprises one or more of aliphatically unsaturated linear, lightly branched, cyclic, or resinous organopolysiloxane.

3. The gel of claim 1, wherein the Si—H-functional crosslinker comprises one or more linear, lightly branched, cyclic, or resinous organopolysiloxanes bearing more than two Si—H groups on average.

4. The gel of claim 1, wherein at least one aliphatically unsaturated organopolysiloxane has the formula:

$$R^1_a R_b SiO\!-\!\!\left[SiRR^3\!-\!O\right]_m\!\left[SiR^1R\!-\!O\right]_n\!-\!SiR_b R^1_a \qquad (I)$$

where a is 1 or 2, b is 1 or 2, and the sum of a+b is 3; m is 10 to 200; n is 0-10;

$R^1$ is an aliphatically unsaturated hydrocarbon group;

R is a $C_{1-20}$ hydrocarbon group containing no aliphatic unsaturation;

$R^3$ is R or an organosiloxy or polyorganosiloxy group containing —$OSiR_2$— siloxy groups and terminated by an $R_3SiO$— group or by a $R^1{}_aR_bSiO$— group, where a, b, and the sum a+b have the meanings previously given, and/or where the at least one aliphatically unsaturated organopolysiloxane is a resin comprising T and/or Q units, and $R_3SiO_{1/2}$ M groups.

5. The gel of claim 1, wherein the Si—H-functional organopolysiloxanes(s) contain no terminal Si—H groups.

6. The gel of claim 1, wherein at least one Si—H-functional organopolsyiloxane is one of the formula:

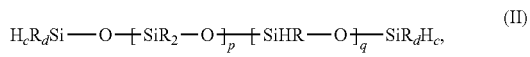

(II)

where R is a $C_{1-20}$ hydrocarbon group containing no aliphatic unsaturation, p is from 0 to 200, and q is from 0 to 200, where the p diorganosiloxy groups and q hydrogen organosiloxy groups are distributed in any manner, and p+q is at least 2, c is 0 or 1, d is 2 or 3, and the sum of c+d is 3.

7. The gel of claim 1, wherein the crosslinked gel (a) is present in an amount of from 5-50 weight percent based on the total weight of the gel.

8. The gel of claim 7, wherein the natural oil(s) comprise from 10 to 70 weight percent of the gel based on the weight of the gel.

9. The gel of claim 1, wherein the hydrocarbon diluent(s) comprises at least one aliphatic hydrocarbon containing 10-20 carbon atoms.

10. The gel of claim 1, wherein the hydrocarbon diluent(s) comprise from 10 to 50 wt. % of the gel based on the weight of the gel.

11. A process for the preparation of a gel according to claim 1, comprising reacting at least one aliphatically unsaturated organopolysiloxane, at least one Si—H-functional organopolysiloxane, and at least one α-olefin containing 6 or more carbon atoms, in the presence of a hydrocarbon diluent, a natural oil, and a hydrosilylation catalyst to form a crosslinked gel.

12. The process of claim 11, wherein following preparation of the gel, the gel is sheared to produce a creamy gel.

13. The process of claim 11, wherein Si—H functional organopolysiloxane(s), hydrocarbon diluent, α-olefin, hydrosilylation catalyst, and natural oil are initially present, aliphatically unsaturated organopolysiloxane is then added, and then hydrosilylation to a gel occurs.

14. The process of claim 11, wherein Si—H functional organopolysiloxane(s), hydrocarbon diluent(s), natural oil(s), and α-olefin(s) are initially present along with a hydrosilylation catalyst, the reaction mixture is heated to initiate hydrosilylation, aliphatically unsaturated organopolysiloxane is then added, and reaction continues until a crosslinked gel is formed.

* * * * *